(12) United States Patent
Megliola et al.

(10) Patent No.: US 7,900,956 B2
(45) Date of Patent: Mar. 8, 2011

(54) INTERIOR TRIM FOR A MOTOR VEHICLE INTEGRATING A LID FOR AN AIRBAG

(75) Inventors: Sergio Megliola, Modena (IT); Fabio Toni, Maranello (IT); Michela Bruzzone, Formigine (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 12/445,451

(22) PCT Filed: Oct. 12, 2007

(86) PCT No.: PCT/IB2007/003049
§ 371 (c)(1),
(2), (4) Date: Dec. 28, 2009

(87) PCT Pub. No.: WO2008/044137
PCT Pub. Date: Apr. 17, 2008

(65) Prior Publication Data
US 2010/0109298 A1 May 6, 2010

(30) Foreign Application Priority Data
Oct. 13, 2006 (IT) .............................. BO2006A0711

(51) Int. Cl.
*B60R 21/20* (2006.01)
(52) U.S. Cl. ..................................................... 280/728.3
(58) Field of Classification Search ............... 280/728.3; 156/60, 152
See application file for complete search history.

(56) References Cited

U.S. PATENT DOCUMENTS

| 5,447,328 A * | 9/1995 | Iannazzi et al. ............ 280/728.3 |
| 6,092,835 A | 7/2000 | Thakore et al. |
| 6,109,645 A | 8/2000 | Totani et al. |
| 7,178,825 B2 * | 2/2007 | Fujii et al. .................. 280/728.3 |
| 7,425,018 B2 * | 9/2008 | Suwama et al. ........... 280/728.3 |
| 7,556,284 B2 * | 7/2009 | Riha et al. .................. 280/728.3 |

FOREIGN PATENT DOCUMENTS

| EP | 1069006 | 1/2001 |
| EP | 1145923 | 10/2001 |
| FR | 2809692 | 7/2001 |
| JP | 10119687 | 5/1998 |
| WO | 2005049391 | 6/2005 |

OTHER PUBLICATIONS

International Search Report for Application Serial No. PCT/IB2007/003049; European Patent Office Mar. 13, 2008.

* cited by examiner

*Primary Examiner* — Faye M. Fleming
(74) *Attorney, Agent, or Firm* — Bryan A. Santarelli; Graybeal Jackson LLP

(57) ABSTRACT

An embodiment of an interior trim for a motor vehicle integrating a lid for an airbag; the trim having: an inner layer, made of rigid plastic material having a behavior of a thermosetting type, which constitutes the skeleton; an intermediate layer, made of spongy plastic material that bestows softness to the touch; an outer coating layer having aesthetic purposes; and a reinforcement element, which is fixed with respect to the inner layer and involves the entire area of the lid.

22 Claims, 4 Drawing Sheets

INTERIOR TRIM FOR A MOTOR VEHICLE INTEGRATING A LID FOR AN AIRBAG

PRIORITY CLAIM

The present application is a United States national phase application filed pursuant to 35 USC §371 of International Patent Application Serial No. PCTIB2007/003049, filed Oct. 12, 2007; which application claims priority to Italian Patent Application Serial No. BO2006A000711, filed Oct. 13, 2006; which foregoing applications are incorporated herein by reference in their entireties.

TECHNICAL FIELD

An embodiment of the present invention relates to an interior trim for a motor vehicle integrating a lid for an airbag.

BACKGROUND

In modern motor cars, there is an increasingly widespread presence of active and passive safety devices. In particular, inserted within the passenger compartment of a motor car is an increasing number of airbags in an attempt to protect all the occupants of the motor car in the best possible way in the event of an accident.

There is by now present in almost all new motor cars a front airbag for the passenger, said airbag being set in a housing within the dashboard that is closed at the front by a lid. In currently produced cars, there exist two types of lid for the airbag: either in view, i.e., visible on the aesthetic part of the trim, or else hidden from view, i.e., integrated in the skeleton and not visible on the aesthetic part of the trim.

In motor cars with the lid integrated in the skeleton, the coating material of the trim can be made of fabric, leather, or plastic material. To enable opening of the lid of the airbag in the event of an accident, at a point corresponding to the lid itself, the coating layer is pre-weakened by means of an internal line of incision (and hence not visible from the passenger compartment) that runs along the perimeter of the lid.

In known applications, the trim supporting the lid of the airbag has an inner layer made of moulded plastic material of a thermoplastic type (for example, polypropylene) that constitutes the skeleton, an intermediate layer made of spongy plastic material that bestows softness to the touch, and an outer coating layer having aesthetic purposes (for example, made of fabric or leather). However, providing the inner layer made of moulded plastic material of a thermoplastic type involves the construction of a relatively complex and costly production plant that calls for a yearly output of at least a few hundreds of thousands of pieces in order to be economically advantageous. Consequently, the use of moulded plastic material of a thermoplastic type may not be economically sustainable for a limited yearly output (for example, fewer than 4000-5000 pieces per year).

For a limited yearly production, it is economically advantageous to make the inner layer of the trim supporting the lid of the airbag made of thermosetting plastic material; however, thermosetting plastic materials are generally less elastic and more brittle than thermoplastic plastic materials. Consequently, using a thermosetting plastic material for making the inner layer of the trim supporting the lid of the airbag may give rise to the risk, at the moment of inflation of the airbag, of the lid bursting into pieces, with the slivers projecting (at least partially) in the direction of the passenger and thus constituting a serious hazard.

Furthermore, U.S. Pat. No. 6,092,835A1, which is incorporated by reference, discloses an automotive instrument panel having a concealed airbag. A molded substrate having first and second surfaces and an aperture there through receives an airbag; a curved metal door is secured to the second surface of the substrate by a plurality of fasteners extending through the substrate. The metal door has a generally U-shaped slot with first and second ends being spaced apart a distance greater than the length of the aperture. A molded covering overlies the second surface and the door and is secured thereto with an intermediate layer of foam and a foam gasket overlies the slot between the door and the substrate; a foam impermeable layer is placed between the gasket and door to prevent injected foam from impregnating the foam gasket and interfering with the opening of the door.

SUMMARY

An embodiment of the present invention is an interior trim for a motor vehicle integrating a lid for an airbag, the interior trim of which is free from the drawbacks described above, is in compliance with the specific norms and standards approved and certified at a world level, and at the same time is easy and economically advantageous to produce.

BRIEF DESCRIPTION OF THE DRAWINGS

One or more embodiments of the present invention will now be described with reference to the drawings, which illustrate some non-limiting examples thereof, in which.

DETAILED DESCRIPTION

Figure 1:
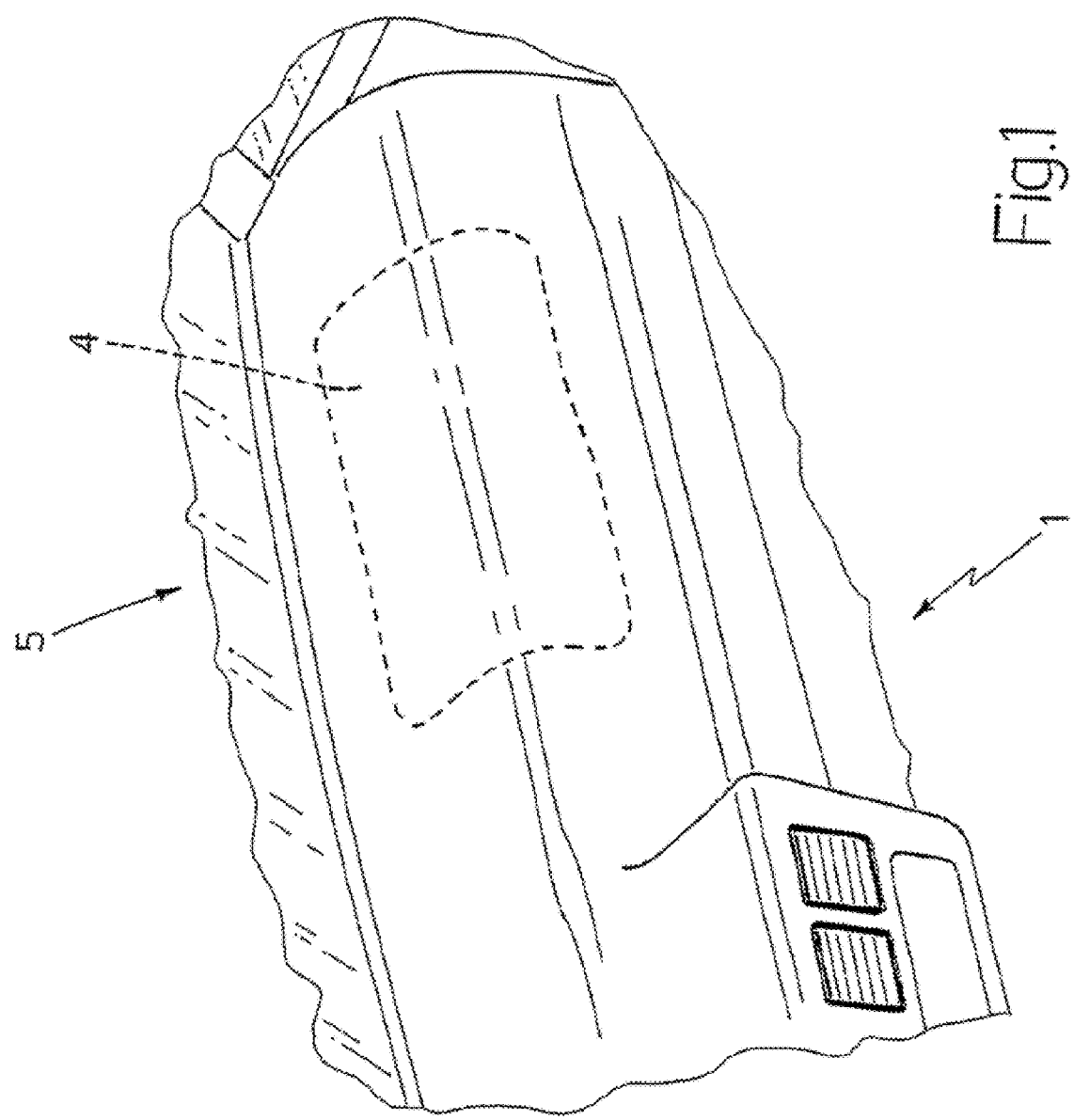
FIG. 1 is a schematic perspective view of the dashboard of a motor car provided with an interior trim made in accordance with an embodiment of the present invention.

In FIG. 1, the reference number 1 designates as a whole a dashboard of a motor car with a view corresponding to the passenger side.

Figure 2:
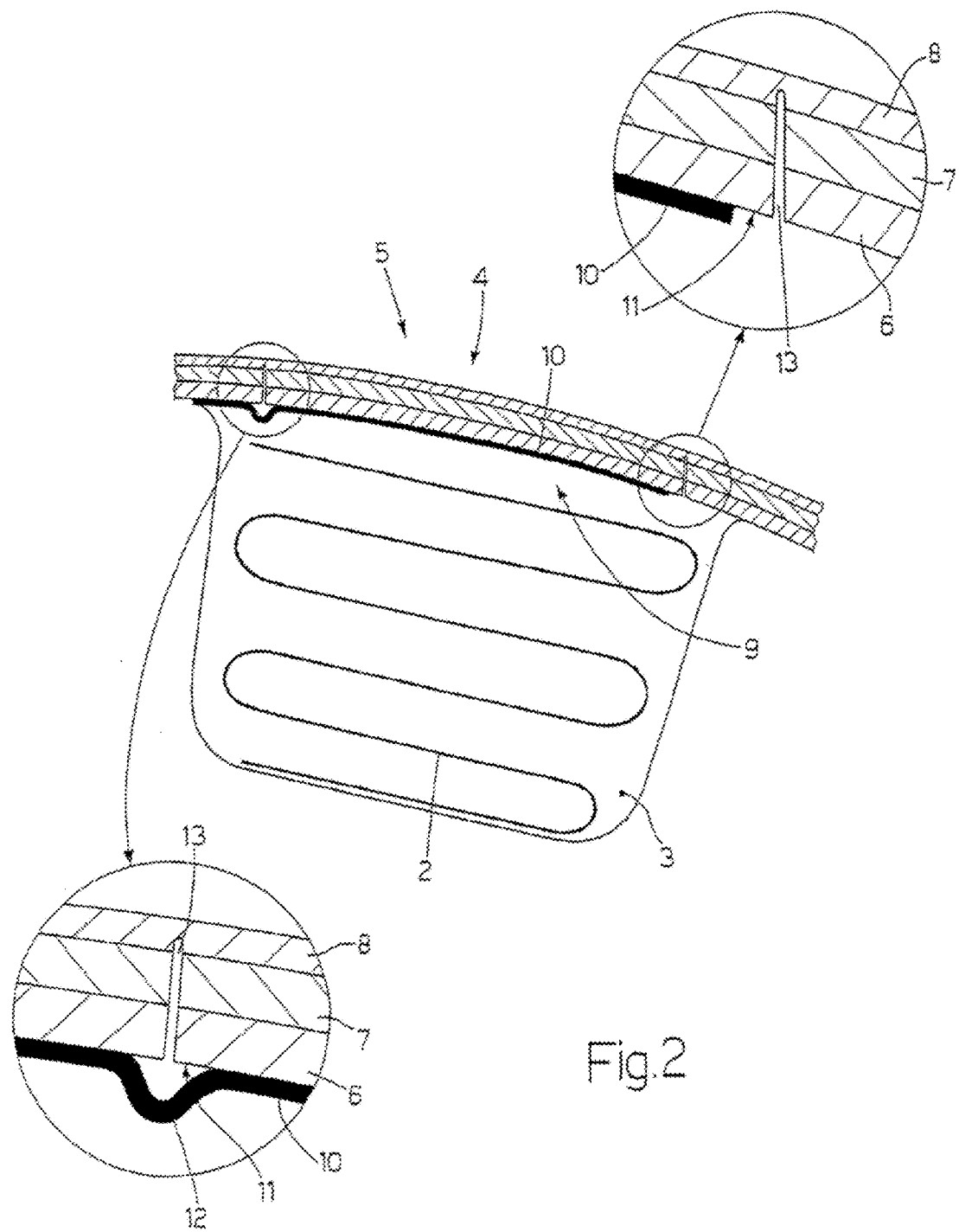
FIG. 2 is a schematic view, with parts removed for reasons of clarity, of a lateral cross section of the trim of FIG. 1.

According to what is illustrated in FIGS. 1 and 2, the dashboard/is provided with an airbag 2 (illustrated in FIG. 2), which is set within a housing 3 (illustrated in FIG. 2), closed at the top by a lid 4 that is shaped so as to open in the event of inflation of the airbag 2 and under the thrust of the airbag 2 itself.

According to what is illustrated in FIG. 2, the lid 4 is integrated in a rigid interior trim 5, which forms part of the dashboard 1. The trim 5 comprises an inner layer 6 made of rigid plastic material having a behavior of a thermosetting type (typically a product of reaction, such as polyurethane or the like) that constitutes the skeleton, an intermediate layer 7 made of spongy plastic material that bestows softness to the touch, and an outer coating layer 8 (made of leather, fabric, or else plastic material) having an aesthetic purpose, as well as a purpose that is functional for the inflation and splaying-out of the airbag 2. By way of example, the inner layer 6 has a thickness of 3-4 mm, the intermediate layer 7 has an undeformed thickness of 3 mm, and the outer layer 8 has a thickness of 1.5 mm.

Applied to the inner layer 6 is a reinforcement element 9, which is fixed with respect to the inner layer 6 and involves the entire area of the lid 4. According to the embodiments illustrated in FIGS. 2, 3 and 5, the reinforcement element 9 comprises a metal plate 10, which rests on a bottom surface 11 of the inner layer 6, is connected rigidly to the inner layer 6 by means of mechanical fixing (for example, riveting) or gluing, and has at least one hinge 12 at an edge of the lid 4 of the airbag 2.

According to what is illustrated in FIG. 2, at the edges of the lid 4 of the airbag 2 the trim 5 has a weakening incision 13, which traverses the entire inner layer 6, traverses the entire intermediate layer 7, and only partially traverses the outer layer 8. It should be emphasized that at a point corresponding to the hinge 12 the weakening incision 13 could traverse only the rigid inner layer 6 in so far as the layers 7 and 8 are flexible and hence behave locally like hinges additional to the hinge 12 of the metal plate 10.

Figure 5:
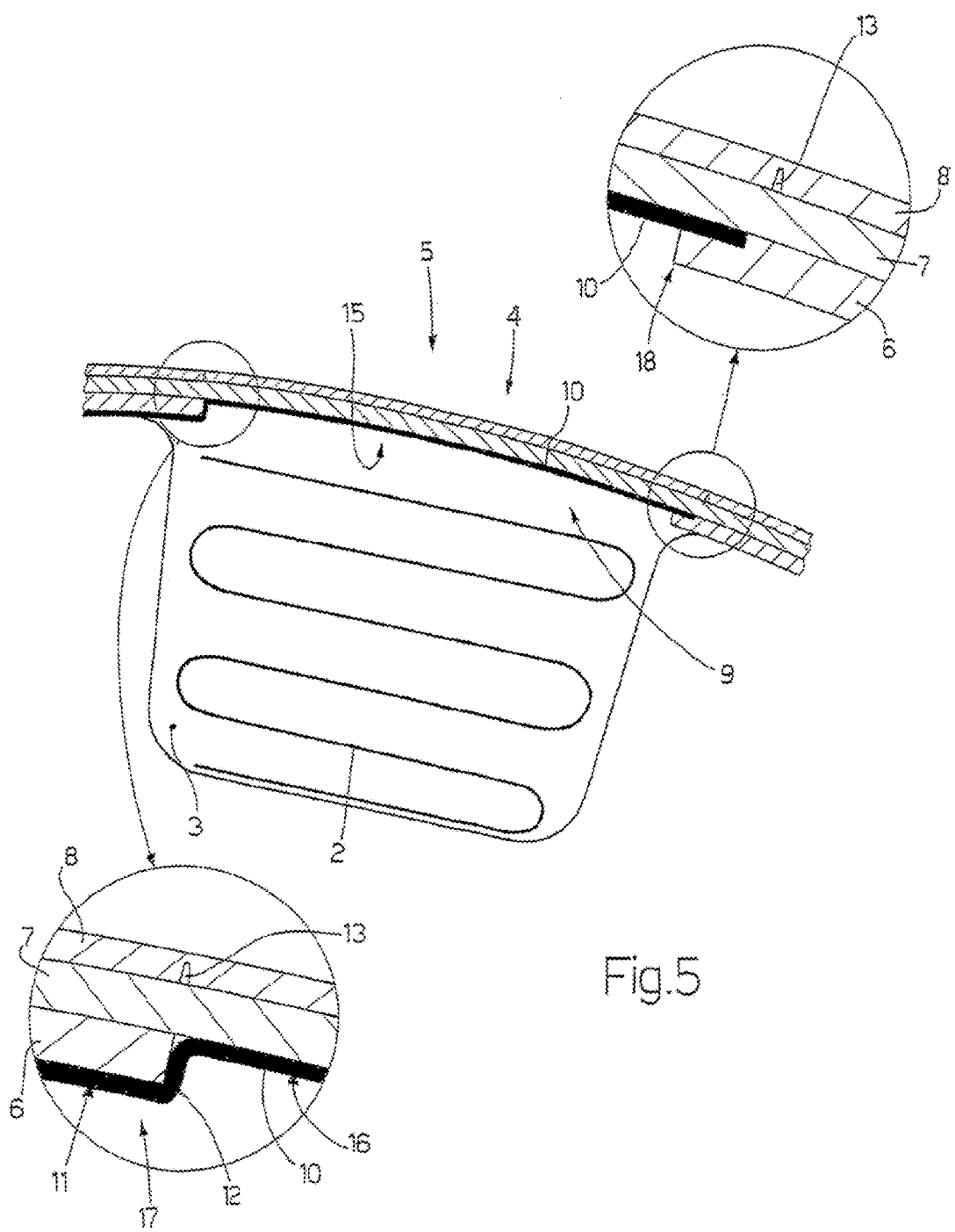
FIG. 5 is a schematic view, with parts removed for reasons of clarity, of a lateral cross section of a different embodiment of the trim of FIG. 1.

According to the embodiment illustrated in FIGS. 2 and 5, the metal plate 10 has a single hinge 12 set at an edge of the lid 4 of the airbag 2. According to a different embodiment (not illustrated), the metal plate 10 has two hinges 12, set in points corresponding to opposite edges of the lid 4 of the airbag 2; in this case, the lid 4 also has a central weakening and is split into two halves to enable the airbag 2 to come out.

In use, during inflation and splaying-out of the airbag 2, the pressure exerted by the airbag 2 as it expands on the lid 4 determines tearing of the outer layer 8 along the weakening incision 13, and hence the subsequent opening of the lid 4 by means of a rotation of approximately 180° of the metal plate 10 about the hinge 12.

To produce the trim 5 illustrated in FIG. 2, a method of production envisages making the inner layer 6 by means of injection moulding, of applying the intermediate layer 7 on the inner layer 6 formed previously by means of injection co-moulding or else by means of gluing, and of applying the outer layer 8 by covering the intermediate layer 7 with the leather.

Furthermore, the metal plate 10 may be applied by means of mechanical fixing (for example, riveting) or gluing to the inner layer 6, and finally the weakening incision 13 may be made by laser cutting (or by means of a cut made using blades). To enable formation of the weakening incision 13 after application of the metal plate 10, the metal plate 10 itself may have through slots set along the edge of the lid 4 of the airbag 2 to enable the action of the cutting means. Alternatively, the metal plate 10 could be applied to the inner layer 6 after the formation of the weakening incision 13.

Figure 4:
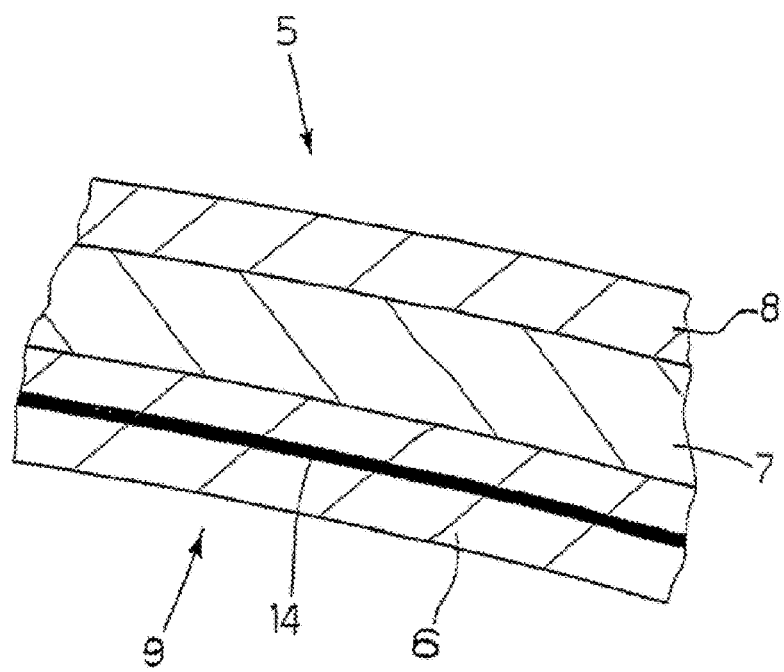
FIG. 4 illustrates a view, at an enlarged scale, of a detail of the trim of FIG. 1 according to another embodiment.

According to the embodiment illustrated in FIG. 4, the reinforcement element 9, instead of the metal plate 10, comprises a woven meshwork 14, which is embedded in the inner layer 6 and is made of a fabric of polymer fibers (for example, polyester or polyethylene); the meshwork 14 may be embedded in the inner layer 6 by means of co-moulding, i.e., inserting the meshwork 14 in the mould of the inner layer 6 and then injecting the plastic material around the meshwork 14.

Figure 3:
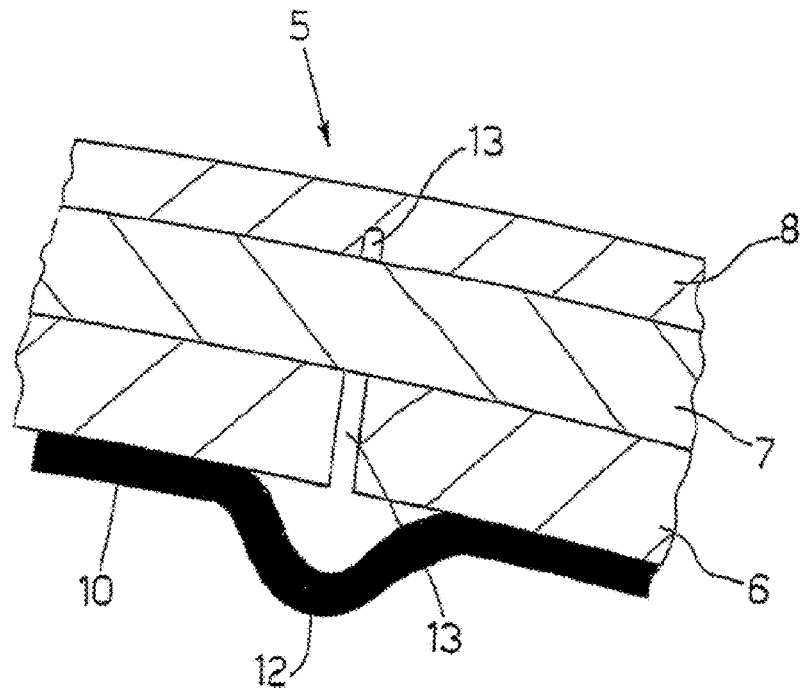
FIG. 3 illustrates a view, at an enlarged scale, of a detail of the trim of FIG. 1 according to another embodiment.

According to the embodiment illustrated in FIG. 3, the weakening incision 13 traverses the entire inner layer 6, only partially traverses the outer layer 8, and does not traverse the intermediate layer 7 at all. The intermediate layer 7 may be made of foamed plastic material, which has a reduced strength and is easily torn by the force generated by the inflation of the airbag 2 even in the absence of weakening by an incision.

To produce the trim 5 illustrated in FIG. 3, a method of production envisages making the inner layer 6 by means of injection moulding and already provided with the respective weakening incision 13 (pre-shearing in the mould). Subsequently, the metal plate 10 is applied to the inner layer 6 by mechanical fixing (for example, riveting) or gluing, and then the intermediate layer 7 is applied to the inner layer 6 formed previously by means of injection co-moulding (or else by means of gluing). Finally, the weakening incision 13 is made on the outer layer 8, and the outer layer 8 itself is applied, covering the intermediate layer 7 with the leather. Alternatively, after application of the intermediate layer 7 to the inner layer 6, the intermediate layer 7 could be cut to make the weakening incision 13 also in the intermediate layer 7 itself.

According to an embodiment illustrated in FIG. 5, the inner layer 6 has a through hole 15 at a point corresponding to the lid 4 of the airbag 2 (i.e., the inner layer 6 is absent in an area corresponding to the lid 4 of the airbag 2). The reinforcement element 9 comprises a metal plate 10, which rests both on a bottom surface 11 of the inner layer 6 and on a bottom surface 16 of the intermediate layer 7, is connected rigidly to the inner layer 6, and has at least one hinge 12 at an edge of the lid 4 of the airbag 2.

The metal plate 10 may be S-shaped in such a way as to present a first end 17 located at a point corresponding to the hinge 12 that rests on and is connected to the inner layer 6, and a second end 18 opposite to the first end 17 and set between the inner layer 6 and the intermediate layer 7.

To produce the trim 5 illustrated in FIG. 3, a method of production envisages making the inner layer 6 by means of injection moulding and already provided with the through hole 15 (i.e., pre-perforation in the mould). Subsequently, the metal plate 10 is applied to the inner layer 6 by means of mechanical fixing (for example, riveting or gluing), and then the intermediate layer 7 is applied to the inner layer 6 formed previously by means of injection co-moulding or gluing. Finally, the weakening incision 13 is made on the outer layer 8, and the outer layer 8 itself is applied, covering the intermediate layer 7 with the leather. Alternatively, after application of the intermediate layer 7 to the inner layer 6, the intermediate layer 7 could be cut to provide the weakening incision 13 also in the intermediate layer 7 itself.

In the embodiments described above, the trim 5 forms part of the dashboard 1 of a motor car. It should be noted that a further trim, altogether similar to the trim 5 described above, could be used for covering airbags set in parts of the motor car other than the dashboard (for example, door trim, belt trim, and trim for the underside and bottom parts of the dashboard).

One or more embodiments of the trim 5 described above presents numerous advantages in so far as it is easy and economically advantageous to produce even when it is produced with a limited yearly output. The low production cost of the trim 5 derives from the fact that plastic materials having a behavior of a thermosetting type may be used for making the inner layer 6 instead of thermoplastic plastic materials that involve the construction of a complex and costly production plant.

Furthermore, thanks to the presence of the reinforcement element 9, even when it is subjected to the impulsive mechanical stresses produced by inflation and splaying-out of the airbag 2, the inner layer 6 is not dangerous for the occupants of the motor car.

Naturally, in order to satisfy local and specific requirements, a person skilled in the art may apply to the solution described above many modifications and alterations. Particularly, although the present invention has been described with a certain degree of particularity with reference to one or more embodiments thereof, it should be understood that various omissions, substitutions and changes in the form and details as well as other embodiments are possible. Moreover, it is expressly intended that specific elements and/or method steps described in connection with any disclosed embodiment of the invention may be incorporated in any other embodiment as a general matter of design choice.

What is claimed:

1. An interior trim for a motor vehicle integrating a lid for an airbag; the trim comprises:
    an inner layer, made of rigid plastic material, that constitutes the skeleton and having a through hole in a point corresponding to the lid of the airbag;
    an intermediate layer made of spongy plastic material that bestows softness to the touch; and
    an outer coating layer having aesthetic purposes; and
    a reinforcement element, which comprises a metal plate, is fixed with respect to the inner layer and involves nearly the entire area of the lid;
    wherein the metal plate of the reinforcement element rests both on a bottom surface of the inner layer and on a bottom surface of the intermediate layer, is connected rigidly to the inner layer, and has at least one hinge at an edge of the lid of the airbag; and
    wherein the metal plate of the reinforcement element is S-shaped in such a way as to present a first end set in a point corresponding to the hinge that rests on and is connected to the inner layer, and a second end opposite to the first end and set between the inner layer and the intermediate layer.

2. The trim according to claim 1, wherein the rigid plastic material that constitutes the inner layer is a product of reaction that has a behavior of a thermosetting type.

3. The trim according to claim 2, wherein the rigid plastic material that constitutes the inner layer is a polyurethane material.

4. The trim according to claim 1, wherein the outer coating layer is made of leather.

5. The trim according to claim 1, wherein at the edges of the lid of the airbag the trim has a weakening incision, which involves only partially the outer layer, and does not involve the intermediate layer at all.

6. The trim according to claim 1, wherein at the edges of the lid of the airbag the trim has a weakening incision, which involves the entire inner layer, involves only partially the outer layer, and does not involve the intermediate layer at all.

7. The trim according to claim 1, wherein the reinforcement element comprises a meshwork embedded within the inner layer.

8. The trim according to claim 7, wherein the meshwork is woven.

9. A method for producing an interior trim for a motor vehicle integrating a lid for an airbag; the method comprises the steps of:
    providing an inner layer of trim made of rigid plastic material that constitutes the skeleton;
    providing an intermediate layer of the trim made of spongy plastic material that bestows softness to the touch;
    providing an outer layer of the coating trim having aesthetic purposes; and
    the method is characterized in that it comprises the further step of providing a reinforcement element, which is fixed with respect to the inner layer and involves the entire area of the lid: and
    the lid of the airbag a weakening incision, which involves the entire inner layer and the intermediate layer and involves only partially the outer layer.

10. The method according to claim 9, wherein the rigid plastic material that constitutes the inner layer is a product of reaction that has a behavior of a thermosetting type.

11. The method according to claim 10, wherein the rigid plastic material of a thermosetting type that constitutes the inner layer is a polyurethane material.

12. The trim according to claim 9, wherein the outer coating layer is made of leather.

13. The method according to claim 9, wherein the reinforcement element comprises a meshwork embedded within the inner layer.

14. A method for producing an interior trim for a motor vehicle integrating a lid for an airbag; the method comprises the steps of:
    providing an inner layer of the trim made of rigid plastic material that constitutes the skeleton and having a through hole in a point corresponding to the lid of the airbag;
    providing an intermediate layer of the trim made of spongy plastic material that bestows softness to the touch;
    providing an outer layer of the coating trim having aesthetic purposes; and
    providing a reinforcement element, which comprises a metal plate, is fixed with respect to the inner layer and involves fast completely the entire area of the lid;
    wherein the metal plate of the reinforcement element rests both on a bottom surface of the inner layer and on a bottom surface of the intermediate layer, is connected rigidly to the inner layer, and has at least one hinge at an edge of the lid of the airbag; and
    wherein the metal plate of the reinforcement element is S-shaped in such a way as to present a first end set in a point corresponding to the hinge that rests on and is connected to the inner layer, and a second end opposite to the first end and set between the inner layer and the intermediate layer.

15. The method according to claim 14, wherein the rigid plastic material that constitutes the inner layer is a product of reaction that has a behavior of a thermosetting type.

16. The method according to claim 15, wherein the rigid plastic material of a thermosetting type that constitutes the inner layer is a polyurethane material.

17. The method according to claim 14, wherein the outer coating layer is made of leather.

18. The method according to claim 14, wherein the reinforcement element comprises a meshwork embedded within the inner layer.

19. The method according to claim 14 and comprising, after application of the reinforcement element, the further step of making in the trim and at the edges of the lid of the airbag a weakening incision, which involves the entire intermediate layer and involves only partially the outer layer.

20. The method according to claim 14 and comprising, after application of the reinforcement element, the further step of making in the trim and at the edges of the lid of the airbag a weakening incision, which involves only partially the outer layer, and does not involve the intermediate layer at all.

21. The method according to claim 14 and comprising the further steps of:
    making in the inner layer a through hole in an area corresponding to the lid of the airbag;
    applying the reinforcement element to the inner layer;
    coupling of the inner layer to the intermediate layer;
    making in the outer layer a non-through weakening incision prior to coupling of the outer layer to the intermediate layer; and
    coupling of the outer layer to the intermediate layer.

22. An interior trim for a motor vehicle integrating a lid for an airbag; the trim comprises:
- an inner layer, made of rigid plastic material, that constitutes the skeleton and having a through hole in a point corresponding to the lid of the airbag;
- an intermediate layer made of spongy plastic material that bestows softness to the touch;
- an outer coating layer having aesthetic purposes;
- a reinforcement element, which comprises a metal plate, is fixed with respect to the inner layer and involves nearly the entire area of the lid;
- wherein the metal plate of the reinforcement element rests both on a bottom surface of the inner layer and on a bottom surface of the intermediate layer, is connected rigidly to the inner layer, and has at least one hinge at an edge of the lid of the airbag; and
- wherein at the edges of the lid of the airbag the trim has a weakening incision, which involves the entire inner layer, involves only partially the outer layer, and does not involve the intermediate layer at all.

* * * * *